Nov. 16, 1965   J. A. WALSH ETAL   3,218,491
DYNAMOELECTRIC MACHINE
Filed Oct. 27, 1961
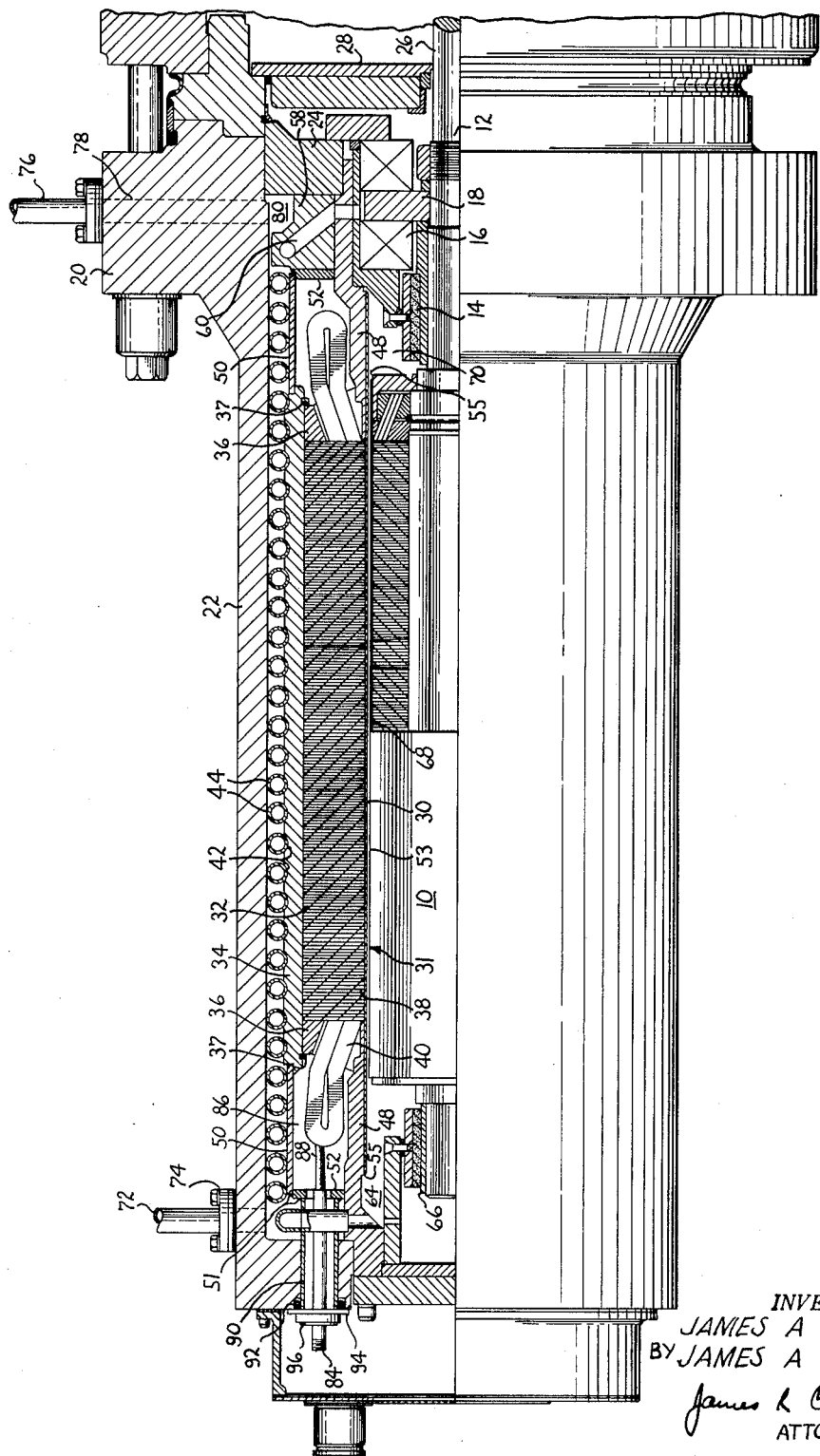
INVENTOR.
JAMES A WALSH
BY JAMES A WATSON
James L Campbell
ATTORNEY

United States Patent Office 3,218,491
Patented Nov. 16, 1965

3,218,491
DYNAMOELECTRIC MACHINE
James A. Walsh, Schenectady, and James A. Watson, Scotia, N.Y., assignors to General Electric Company, a corporation of New York
Filed Oct. 27, 1961, Ser. No. 148,139
5 Claims. (Cl. 310—57)

The invention described herein relates to motors and particularly to an improved design of a combined stator and heat exchange unit capable of being removed as a package from the motor housing.

In some motor-pump combinations designed for pumping high pressure-high temperature liquids, it has been found desirable to permit the pressure of liquid circulated by the attached pump to be reflected into the cavities formed by the operating parts of the motor. This usually is accomplished by allowing slight leakage along the motor shaft into the cavities and since the liquid becomes substantially locked therein, it is circulated in a closed loop through the motor and a heat exchanger which encircles the motor housing or is provided as auxiliary equipment. Our invention is directed towards a new combination wherein the heat exchanger is positioned in contact with a shell shrunk or otherwise disposed on the stator core for permitting efficient exchange of heat between the parts and for facilitating insertion and removal of the stator core-heat exchanger unit in a simple and expeditious manner.

Conventional prior art constructions include winding a coil type heat exchanger on the outside of a pressure vessel enclosing the motor. The disadvantages of this type construction is that an enclosing wrapper must be fabricated and welded outside the exposed portions of the coil in a fashion to provide a passageway between the turns of coil and wrapper establishing a path permitting the circulation of low pressure liquid. Since it is customary to attach conduit boxes, lead seals and other appurtenances on the outside of the motor shell, the space for welding becomes a problem and in some cases, has been accomplished only by making the motor flanges of larger size. The design is such that these parts all must be removed to effect removal of the heat exchanger when repairs or cleaning is necessary. Moreover, since welds must be broken, the parts removed usually must be replaced when reassembly takes place.

Still another disadvantage is that repairs to either the stator core and windings or the heat exchanger must be made in the factory because special disassembly and assembly procedures including special welding techniques are used, often requiring the use of tools especially designed for this purpose. Since the parts including the pressure containing enclosure are all bonded together, the complete unit must be shipped to the factory rather than the individual parts needing repairs.

The primary object of our invention therefore is to eliminate the disadvantages discussed above and associated with motors of this type by providing a simple stator-heat exchanger unit of inexpensive design which readily can be inserted and removed from the motor with a minimum of time and labor.

In carrying out our invention, we provide an integral unit of a stator core and a heat exchanger comprising a package capable of being used in a pressure retaining enclosure which forms the outer housing for a motor. The design of the unit is especially selected to provide economy in manufacture and to permit facilitating repairs to the stator and its windings or cleaning or otherwise repairing the heat exchanger when such work must be performed.

While the specification concludes with claims particularly pointing out and distinctly claiming the subject matter which we regard as our invention, it is believed the invention will be better understood from the following description taken in connection with the accompanying drawing in which:

The single figure of the drawing is a cross-sectional view in elevation of a motor illustrating the combined stator-heat exchanger unit of our invention.

Referring now to the drawing wherein like reference characters designate like or corresponding parts, there is shown a motor of the type adapted for connection with a pump used for pumping a high temperature-high pressure liquid. The motor comprises a squirrel cage rotor of conventional type having a shaft 12 supported in a guide bearing 14 and a thrust bearing 16. The thrust bearing is of a well known conventional type utilizing water as a lubricating medium and generally comprises a runner 18 having carbon pads (not shown) disposed in appropriate shoes and rocker arms on opposite sides of the runner for absorbing thrust generated by the operating parts during motor operation. The thrust bearing is shown as a block diagram and does not constitute a part of this invention. The means for supporting the guide and thrust bearings in the motor consists of a heavy cylindrical flange 20 attached to an end of a pressure retaining enclosure 22, and a ring 24, in a manner more fully described hereafter. The shaft 12 is equipped with an extension 26 extending through an end plate 28 and is adapted for connection to the impeller of a pump in a well known manner. The other end of the shaft is supported in a bearing, not shown, disposed in the opposite end of the motor. As is customary, a cylindrical stainless steel can 30 is shrunk onto the outer surface of the rotor core.

The new construction comprising our invention resides in a combined stator-heat exchanger unit capable of being inserted and removed from the pressure retaining enclosure 22 as a package. The stator 31 comprises a multitude of laminations 32 which are stacked in a cylindrical shell 34 and held under compression by retaining rings 36 disposed on opposite ends of the stacked core. Keys 37 coact with the shell 34 and the rings 36 to maintain the core under compression. Slots 38 are provided in the core for receiving coils 40 comprising the winding for the motor. The shell 34 is preferably made of carbon or stainless steel for enclosing the core along its entire length. As shown, the ends of the shell overhang the stator a short distance. The shell outer surface is equipped with a helical groove 42 extending throughout its length, the groove configuration and depth being such to receive the exposed surfaces of a heat exchange coil 44 adapted for positioning therein.

Since a high pressure liquid of approximately 2000 p.s.i. is circulated through the air gap and other cavities in the motor, it is necessary to protect the stator and its winding against the adverse influence which the liquid would have on the coil insulation. In most instances, the combined temperatures and pressures encountered are such that known insulations are not capable of protecting the windings over a long period of motor use. The electrically operating parts therefore must be enclosed in a water-tight casing. To accomplish this, cylindrical sleeves are placed adjacent opposite ends of the stator bore and many different rings of cylindrical, trapezoidal and other configurations have been designed for absorbing the forces created by the high pressure water in the air gap. Enclosing the end turns however gives rise to a heat dissipation problem since the parts are located in a dead air space. In the present design, such protective sleeves take the form of a pair of cylinders 48 and 50 interconnected by a ring 52 welded or otherwise secured thereto. The other ends of cylinders 48 and 50 are fitted on flanges respectively formed at the stator core and in shell 34, as shown. Small seal welds are then made at 51 for enclosing the end turns in a dead air space. As is customary, a cylindrical can 53 is expanded into contact with the inner peripheral surface of the stator bore and the cylinders extending axially therefrom, a small seal weld 55 being made between the can ends and cylinder 48, thereby forming a complete water-tight construction for the complete stator core.

The other end of the stator core is equipped with a similar pair of cylinders 48 and 50, the difference from the other end being that the member 48 is arranged to extend a longer distance axially of the machine in order to accommodate the thrust bearings and the locking ring 24. Welds 51 are made between the cylinders 48 and 50 and ring 52 as on the opposite end of the machine. Since the high pressure water circulated through the motor may be at its highest temperature near the pump end, it is desirable but not always necessary to circulate it through the heat exchanger from that end. A ring 58 equipped with a liquid passageway 60 communicating with the bearings, is positioned between the rings 24 and 52. As shown, the seal ring 24 is held in position by a weld 62 or key for a reason more fully described hereafter.

It will be understood that in view of the inadequacies of known shaft seals for containing the high pressure-temperature liquid in the pump, the motor cavities are filled with water initially introduced therein through a small clearance which appears between the shaft surface and the housing wall 28. When all the cavities are filled and air vented from the motor enclosure, the pressure of the pump is reflected thereinto through the clearance around the shaft. Since the clearance is of such small size, the water introduced into the pump cavities effectively is locked therein. However, it is necessary to cool and circulate it through the motor for removing heat generated by the electrodynamically cooperating parts, particularly in the air gap where the eddy current losses in the cylindrical cans reach relatively high values.

As shown, the circulating path for the high pressure water consists of passageway 60 on the right side of the motor and heat exchange coil 44 from which it is discharged into cavity 64. Some of the flow serves to lubricate and cool bearing 66 while the major portion flows through the air gap 68. Exit therefrom is into cavity 70 where the guide and thrust bearings 14 and 16 also are lubricated and cooled before being returned to the passageway 60 for recirculation in this closed loop. The function of the high pressure water circulated in the closed loop is to absorb heat by both radiation, conduction and convection from the heat producing parts of the motor. In so doing, it is maintained at a temperature sufficiently low to permit acceptable rise in the operating temperature when the motor is placed under load.

This is accomplished by utilizing a second water circulation system having water under a pressure substantially the same as that of city mains. As indicated on the left side of the drawing, the inlet 72 consists of a conventional fixture connected to the pressure retaining enclosure 22 by a fitting 74. The outlet 76 on the right side of the drawing is of similar design and includes a passageway 78 interconnected with a cylindrical cavity 80. This low temperature-low pressure water is circulated from the inlet around the heat exchange coil 44 positioned between enclosure 22 and shell 34 in the manner indicated by the arrows, prior to being discharged to a drain or to a supplementary heat exchanger, not shown, located remote from the motor. Since it is maintained at a temperature level substantially lower than the liquid circulated through heat exchange coil 44, transfer of heat therebetween is readily accomplished. A pump or other liquid moving device may be used for moving the low temperature water through the system.

Electric power to the winding 40 is supplied through a copper stud 84 which terminates inside the end turn cavity 86. Flexible cables 88 then interconnect the studs with the winding in the stator core. The studs and cables are insulated in the usual manner. In order to preclude escape of water from the motor, pipes 90 housing the studs are secured in a wall of the pressure retaining enclosure 22. O-rings 92 or other sealing means are used for forming a seal effective in preventing water leakage from the motor. The seals are retained in the enclosure 22 by retaining plates 94 and insulators 96 house the studs 84 where they pierce the pressure vessel.

One lead arrangement is shown and described but it will be understood that a plurality are necessary to accommodate the several leads which extend into the motor for connection to the winding. In the alternative, it is evident that all of the leads may enter through one opening in the pressure vessel. In the latter case, conventional prior art sealing means may be used for sealing the multitude of leads in the single opening.

The design described has been made for the specific purpose of permitting simple and quick insertion and removal of a package unit comprising the stator core, shell 34, heat exchanger 44 and the cylinders and rings enclosing the coil end turns. Where the prior practices required breaking numerous welds with the accompanying possibility of damaging the motor enclosing structures, the design herein requires only the removal of a seal weld for effecting removal of the seal ring 24. Upon such removal, the guide and thrust bearings 14 and 16 are easily lifted from the motor structure, thus exposing the stator-heat exchange unit and associated parts. The leads are disconnected from studs 84 and removal thereof is carried out by merely sliding the unit to the right out of the pressure retaining enclosure 22.

In the event the heat exchanger 44 must be cleaned or repaired, it is apparent that such work may be readily accomplished because of its accessible position on the stator core. In some instances, the heat exchanger may be attached flush with the outer surface of the shell 34 or be located in the grooves, as shown. Although a circular type of heat exchanger is disclosed, it will be apparent that coils having other cross sectional designs may be employed, such as those of rectangular shape, either positioned in grooves or placed flush against the outer surface.

In the event part or all of the coils comprising the winding must be removed from the stator core, the shell 34 and heat exchanger 44 may be removed as an integral unit, including the cylindrical members 50 on opposite ends of the shell. These, of course, are removed by breaking welds 51 on opposite ends of the motor and those associated with the cylindrical member 48. When this is accomplished the complete stator is exposed, thus facilitating the easy removal of damaged electrical coils from the magnetic core. A primary advantage gained from utilizing the kind of construction disclosed herein resides in economies to both the manufacturer and user since the stator core and heat exchanger are designed for assembly as an integral unit or package. Its removal and replacement is simple and can be accomplished within a minimum time particularly since the previous requirements of breaking heavy structural welds and removing other appurtenances from the motor exterior surface have now been eliminated.

Another advantage is that since the stator-heat exchanger package is retained in an integral from after removal, it can be shipped with convenience to the factory for repairs as necessary. Spare parts of this type easily can be stored by the user and replaced at will. More efficient operation also results because the heat now is not required to flow radially through the heavy pressure retaining enclosure to the heat exchanger, which in the past, was located on the outer peripheral surface.

Although the disclosure has been directed towards the use of water as a medium for carrying away heat generated by the motor during operation, it will be apparent that other types of fluids may be used such as gases of the liquified petroleum type or other liquids which satisfy the requirements now placed on motors of this type.

In view of the above, it will be apparent that many modifications and variations are possible in light of the above teachings. It therefore is to be understood that within the scope of the appended claims, the invention may be practiced other than as specifically described.

What we claim as new and desire to secure by Letters Patent of the United States is:

1. A stator-heat exchange unit for a motor comprising a laminated magnetic core having a winding disposed in slots therein, end turns projecting outwardly from the core, a cylindrical shell shrunk onto the outer surface of the core and having ends projecting axially therefrom, a combination of co-acting cylindrical and circular members enclosing said end turns and affixed to the cylindrical shell and the stator for enclosing the end turns in a dead air space, the strength of said cylindrical and circular members being such as to resist pressures exerted thereon by a high pressure fluid, a heat exchange element comprising a plurality of spaced turns placed in intimate contact with the outer surface of the shell and secured in permanent contact therewith, thereby providing a construction which easily may be inserted into a pressure retaining enclosure for a motor.

2. The combination according to claim 1 wherein the heat exchanger is disposed in helically shaped grooves provided along the length of the cylindrical shell, and extending axially beyond the ends thereof to a position radially outward from the end turns.

3. The combination according to claim 1 wherein the heat exchange element comprises a plurality of turns of hollow conduits placed in contact with the cylindrical shell and extending axially outward therefrom and in contact with the means enclosing the end turns, a space between each of the turns of coils, the arrangement being such that fluids of different temperatures and pressures may be circulated in one system through the heat exchange coil and in another system around the outer surfaces when the unit is placed in a pressure retaining enclosure of a motor for conducting heat away from the stator when it is placed in operation.

4. A motor comprising a stator and a rotor having a shaft supported in bearings provided in a supporting structure on opposite ends thereof, a thrust bearing disposed on one end of the shaft and supported in said supporting members, a combined stator-heat exchange unit positioned in a pressure retaining enclosure forming the housing for the motor, said pressure retaining enclosure comprising a cylindrical element having on one end an inwardly projecting flange and on its other end an outwardly projecting flange adapted for connecting the pressure retaining enclosure to the casing of a pump, said stator-heat exchange unit comprising a magnetic core having a winding therein and end turns projecting outwardly from opposite ends thereof, pressure retaining means enclosing said end turns, a cylindrical shell disposed around the outer peripheral surface of the stator core and co-acting with said pressure retaining means, a pair of cylindrical sleeves respectively disposed on the rotor surface and in the bore of the stator for establishing an air gap therebetween, said cylindrical sleeve and shell and pressure retaining means all co-acting with one another to enclose the laminated core and the winding therein in a water-tight enclosure, a heat exchange element comprising a multiplicity of spaced turns disposed in grooves and helically wound on the outer peripheral surface of the pressure retaining means and the cylindrical shell for carrying away heat generated by the stator core and its windings during operation, said stator-heat exchange unit having an outer diameter substantially the same as the inner diameter of the pressure retaining enclosure thereby permitting its insertion and removal as a unit, and means positioned axially outward from the stator-heat exchange unit and arranged for co-action with said supporting structure for holding said stator-heat exchange unit in the pressure retaining enclosure while the motor is in operation, said means having incorporated therein a passageway for conducting a high pressure-high temperature liquid in a closed path through the heat exchanger to the opposite end of the stator-heat exchange unit prior to returning through the air gap defined by said cylindrical sleeves for recirculation through the system, and an inlet and an outlet disposed on adjacent opposite ends of the pressure retaining enclosure, a pair of passageways respectively interconnecting said inlet and outlet with cavities at opposite ends of said stator, said passageways being in communication with the spaces existing between adjacent turns of coils in said heat exchanger thereby permitting flow of a low pressure-low temperature liquid around said heat exchanger for removing heat absorbed thereby during operation of the stator.

5. The combination according to claim 4 wherein the means supported in said supporting structure on one end of the stator comprises a pair of substantially cylindrical members disposed in axial relationship for holding said stator-heat exchange unit in position during motor operation, at least one of said members having a passageway therein communicating with said heat exchanger, the other of said members comprising a seal ring attached to said supporting structure, the arrangement being such that removal of said seal ring permits extraction of the stator-heat exchange unit as a package for facilitating cleaning of the heat exchanger or repairs to it or the stator.

References Cited by the Examiner

UNITED STATES PATENTS

| | | | |
|---|---|---|---|
| 2,687,695 | 8/1954 | Blom | 310—87 X |
| 2,887,062 | 5/1959 | Cametti | 310—54 X |
| 3,013,500 | 12/1961 | Bollibon | 103—87 |

MILTON O. HIRSHFIELD, *Primary Examiner.*

DAVID X. SLINEY, *Examiner.*